United States Patent
Liang et al.

(10) Patent No.: US 11,115,809 B2
(45) Date of Patent: Sep. 7, 2021

(54) INDICATION METHOD OF TERMINAL CAPABILITY AND TERMINAL

(71) Applicant: VIVO MOBILE COMMUNICATION CO., LTD., Chang'an Dongguan (CN)

(72) Inventors: Jing Liang, Chang'an Dongguan (CN); Li Chen, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/754,073

(22) PCT Filed: Oct. 11, 2018

(86) PCT No.: PCT/CN2018/109823
§ 371 (c)(1),
(2) Date: Apr. 6, 2020

(87) PCT Pub. No.: WO2019/095903
PCT Pub. Date: May 23, 2019

(65) Prior Publication Data
US 2020/0336889 A1    Oct. 22, 2020

(30) Foreign Application Priority Data

Nov. 15, 2017    (CN) .......................... 201711133014.0

(51) Int. Cl.
*H04L 5/00*    (2006.01)
*H04W 8/24*    (2009.01)
*H04W 48/08*   (2009.01)

(52) U.S. Cl.
CPC ............. *H04W 8/24* (2013.01); *H04W 48/08* (2013.01)

(58) Field of Classification Search
CPC .......... H04W 8/24; H04W 48/08; H04L 5/00; H04L 5/001; H04L 5/0091; H04L 5/0053
See application file for complete search history.

(56) References Cited

U.S. PATENT DOCUMENTS

2015/0271726 A1    9/2015  Kim et al.
2016/0270139 A1    9/2016  Rahman et al.
(Continued)

FOREIGN PATENT DOCUMENTS

CN    106134240 A    11/2016
CN    107371274 A    11/2017
(Continued)

OTHER PUBLICATIONS

Chinese First Office Action Application No. 201711133014.0; dated Jan. 6, 2020.
(Continued)

*Primary Examiner* — Joseph E Dean, Jr.
(74) *Attorney, Agent, or Firm* — von Briesen & Roper, s.c.

(57) ABSTRACT

A terminal capability indication method and a terminal are provided. The method includes sending, to network side, capability indication information indicating whether the terminal supports uplink dual-transmission per band combination; wherein the capability indication information includes at least one: first indication information of a band combination supported by the terminal; second indication information of a channel combination if the channel combination exists in the band combination; third indication information indicating RF characteristic of the terminal, the first indication information includes type information of the band combination or information about whether the band combination must support uplink dual-transmission, the second indication information includes type information of the channel combination or information about whether the channel combination must support uplink dual-transmission, the third indication information includes indication about whether the RF characteristic of the terminal supports uplink dual-transmission.

19 Claims, 2 Drawing Sheets

(56) References Cited

U.S. PATENT DOCUMENTS

| | | | |
|---|---|---|---|
| 2017/0006598 A1* | 1/2017 | Uemura | H04L 5/0048 |
| 2017/0171739 A1* | 6/2017 | Suzuki | H04W 72/06 |
| 2020/0260262 A1 | 8/2020 | Hong | |
| 2020/0260436 A1 | 8/2020 | Hong | |
| 2020/0275490 A1 | 8/2020 | Li et al. | |

FOREIGN PATENT DOCUMENTS

| | | |
|---|---|---|
| CN | 108401532 A | 8/2018 |
| CN | 108476421 A | 8/2018 |
| CN | 109309915 A | 2/2019 |
| CN | 109451861 A | 3/2019 |
| CN | 109495915 A | 3/2019 |
| CN | 110022616 A | 7/2019 |
| EP | 3188568 A1 | 7/2017 |
| WO | 2016078969 A1 | 5/2016 |
| WO | 2017025660 A1 | 2/2017 |
| WO | 2017027057 A1 | 2/2017 |

OTHER PUBLICATIONS

Oppo; "Discussion or 1Tx/2Tx UE capability for EN-DC", 3GPP TSG-RAN2#99bis, R2-1710248, Prague, Czech Republic, Oct. 9, 2017-Oct. 13, 2017.

Vivo; "Capability signaling for single UL transmission", 3GPP TSG-RAN WG2 Meeting #99bis, R2-1711148, Prague, Czech Republic, Oct. 9, 2017-Oct. 13, 2017.

Extended European Search Report for related Application No. 18877370.9; dated Dec. 4, 2020.

Ericsson, "UE capability coordination for LTE-NR interworking", Apr. 3-7, 2017, 3GPP TSG RAN WG2 #90bis, Spokane, USA.

Apple Inc., "Performance Evaluation of LTE NR DC Dual UL and Single UL", Oct. 9-13, 2017, 3GPP TSG-RAN WAG4 Meeting #84bis, Dubrovnik, Croatia.

\* cited by examiner

US 11,115,809 B2

INDICATION METHOD OF TERMINAL CAPABILITY AND TERMINAL

CROSS-REFERENCE TO RELATED APPLICATION

This patent application is a 35 USC § 371 U.S. national stage of International Application No. PCT/CN2018/109823 filed on Oct. 11, 2018, which claims a priority of the Chinese Patent Application No. 201711133014.0 filed in China on Nov. 15, 2017, the disclosures of which are incorporated in their entirety by reference herein.

TECHNICAL FIELD

The present disclosure relates to the field of communication technology, in particular, relates to a method of indicating capability of a terminal and a terminal.

BACKGROUND

In a wireless communication network, a network side determines how to schedule a terminal according to capability of the terminal. Accordingly, the terminal needs to report the capability of the terminal when accessing a network. Under a carrier aggregation scenario, a concept of Band Combination (BC) is introduced to the capability of a terminal. That is, a terminal reports according to the BC. In a dual connection (i.e., EN-DC) between a Long Term Evolution (LTE) and New Radio (NR), it has been determined that a capability indication about whether single transmission (1 UL Tx) needs to be supported is required to be reported according to the BC, and a concept of Channel Combination (CC), i.e., a plurality of channels within a band, is introduced at the same time, and is finer granularity than the band. FIG. 1 shows a diagram of architecture of capability reporting of a terminal. As shown in FIG. 1, granularities of capability reporting of the terminal are sequentially from the largest to the smallest: per BC, per band, per Downlink (DL)/Uplink (UL), Multiple Input Multiple Output (MIMO)/bandwidth class.

In a current procedure of reporting terminal capability, since a terminal makes a report to the network side according to the BC, an indication of whether the terminal must support uplink dual-transmission needs also to be reported to the network side together with other radio frequency parameters.

In addition, for various problem scenarios defined according to a Radio Access Network (RAN) 4, a terminal may also report whether the uplink dual-transmission must be supported in a current event according to different problem scenarios.

In a case that a Fifth Generation (5G) terminal is configured with uplink dual-connection or multiple cells, uplink dual-transmission may be used to improve system performance such as a data rate. However, in some frequency points or bandwidths, due to interference characteristics from a signal, performance of the terminal using uplink dual-transmission is degraded due to the interference, and if the interference is serious, the performance in case of using uplink dual-transmission is worse than that in case of using uplink single transmission. The interference characteristics includes intermodulation interference or harmonics interference.

In implementation of a terminal, in order to realize uplink dual-transmission, a higher cost is required for implementing a filter, thereby reducing interference between two uplink connections or between uplink and downlink.

Due to the interference caused by uplink dual-transmission, a 5G terminal cannot perform uplink dual-transmission in some scenarios or in some frequency bands. For the indication of whether a terminal must support uplink dual-transmission, it is determined at present only that reporting is made according to the BC, but for a case where there is an easy CC in a difficult BC, there is no specific signaling related to how a terminal reports support information of the uplink dual-transmission in the case.

SUMMARY

In a first aspect, some embodiments of the present invention provide a method of indicating capability of a terminal. The method includes: sending to a network side capability indication information, per each band combination in a plurality of band combinations, indicating whether or not a terminal supports uplink dual-transmission; wherein the capability indication information includes at least one of following: first indication information of a band combination supported by the terminal; second indication information of a channel combination in the band combination in a case that the channel combination exists in the band combination; and third indication information indicating radio frequency characteristic of the terminal, the first indication information includes type information of the band combination or information about whether or not the band combination must support uplink dual-transmission, the second indication information includes type information of the channel combination or information about whether or not the channel combination must support uplink dual-transmission, and the third indication information includes indication about whether or not the radio frequency characteristic of the terminal supports uplink dual-transmission.

In a second aspect, some embodiments of the present disclosure further provide a terminal. The terminal includes: a sending module used to send to a network side, capability indication information, per each band combination in a plurality of band combinations, indicating whether or not the terminal supports uplink dual-transmission; wherein the capability indication information includes at least one of following: first indication information of a band combination supported by the terminal; second indication information of a channel combination in the band combination in a case that the channel combination exists in the band combination; and third indication information indicating radio frequency characteristic of the terminal; wherein the first indication information includes type information of the band combination or information about whether or not the band combination must support uplink dual-transmission, the second indication information includes type information of the channel combination or information about whether or not the channel combination must support uplink dual-transmission, and the third indication information includes indication about whether or not the radio frequency characteristic of the terminal supports uplink dual-transmission.

In a third aspect, some embodiments of the present disclosure further provide a terminal. The terminal includes a storage, a processor and a program stored on the storage and executable by the processor, wherein when the program is executed by the processor, the processor implements steps of the aforementioned method of indicating capability of a terminal.

In a fourth aspect, some embodiments of the present disclosure further provide a computer-readable storage medium, wherein a program is stored on the computer-readable storage medium; when the program is executed by a processor, the processor implements steps of the aforementioned method of indicating capability of a terminal.

DETAILED DESCRIPTION

Figure 1:
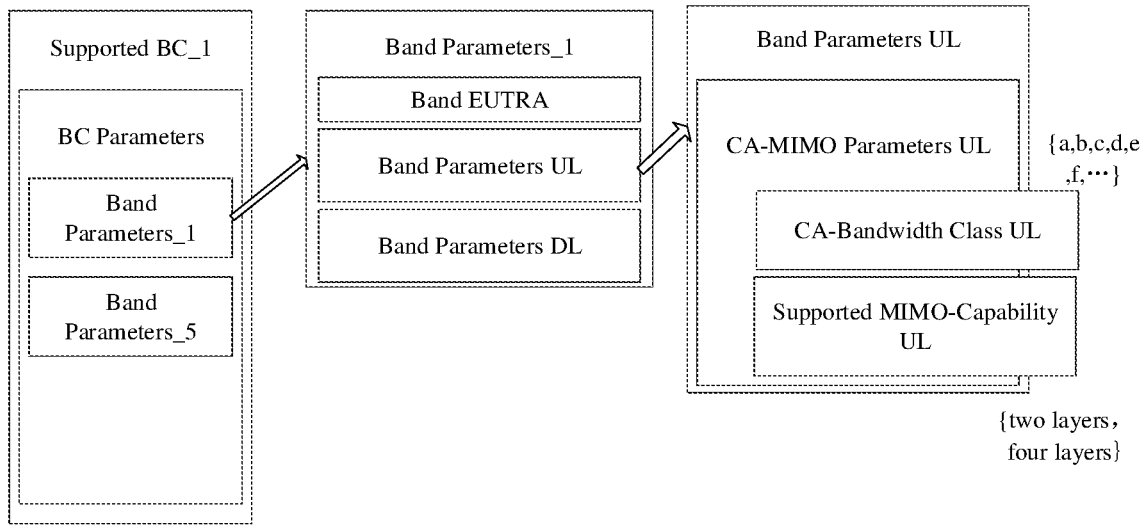
FIG. 1 is a diagram of an architecture of capability reporting of a terminal according to some embodiments of the present disclosure.

Technical solution in some embodiments of the present disclosure will be clearly and completely described hereinafter in conjunction with drawings in some embodiments of the present disclosure. It will be apparent that the described embodiments are a part, rather than all, of the embodiments of the present disclosure. Based on the embodiments of the present disclosure, all other embodiments obtained by those of ordinary skill in the art without creative work are within the protection scope of the present disclosure.

Such terms as "first," "second," etc. in the specification and claims of the present application are used to distinguish similar objects and need not be used to describe a particular order or sequence. It should be understood that terms so used may be interchanged where appropriate in order to implement some embodiments of the present application described herein, such as in a sequence other than those illustrated or described herein. In addition, such terms as "include" and "have," and any variations thereof, are intended to cover a non-exclusive inclusion thereof, for example, processes, methods, systems, products or devices including a series of steps or units need not be limited to those steps or units clearly listed, but may include other steps or units not clearly listed or inherent to these processes, methods, products or devices. In addition, use of "and/or" in the specification and claims indicates at least one of connected objects by "and/or", such as A and/or B indicates three cases that an individual A exists only, an individual B exists only, and both A and B exist.

In the embodiments of the present disclosure, such words as "exemplary" or "such as" are used to refer to as examples, illustrations, or illustration. Any embodiment or design described as being "exemplary" or "for example" in the embodiments of the present disclosure should not be construed as being preferable or advantageous than other embodiments or designs. Specifically, use of words such as "exemplary" or "for example" is intended to present a relevant concept in a specific manner.

Embodiments of the present disclosure are described below with reference to accompanying drawings. The method and the device of controlling a carrier state provided by some embodiments of the present disclosure may be applied to a wireless communication system. The wireless communication system may be a system employing a fifth generation (5G) mobile communication technology (hereinafter referred to simply as a 5G system or a 5G NR system), as will be understood by those skilled in the art, a 5G NR system is merely an example and not a limitation.

It should be noted that in some embodiments of the present disclosure, in a case that signal interference among frequency points or bandwidths in a band combination is significant (e.g., the signal interference exceeds a configured upper limit), the band combination is called a difficult type of band combination, whereas in a case that there is no interference or the interference is insignificant among the frequency points or the bandwidths in a band combination, the band combination is called an easy type of band combination. In a case that interference is significant among frequency points or bandwidths in a channel combination, the channel combination is called a difficult type of channel combination, whereas in a case that there is no interference or the interference is insignificant among frequency points or bandwidths in a channel combination, the channel combination is called an easy type of channel combination.

Embodiments of the present invention provide a method of indicating capability of a terminal and a terminal, so as to address a problem that, in a 5G system, it is determined at present only that a terminal needs to report, according to a BC, an indication of whether uplink dual-transmission must be supported, however, in a case that an easy CC exists in a difficult BC, there is no clear report scheme, leading to a problem that a network communication flow is incomplete and reliability of network communication cannot be guaranteed.

Figure 2:
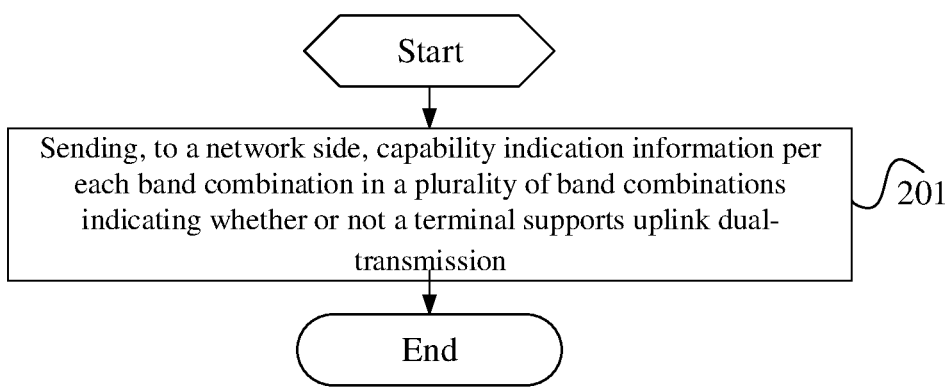
FIG. 2 is a flow chart of a method of indicating capability of a terminal according to some embodiments of the present disclosure.

As shown in FIG. 2, some embodiments of the present disclosure provide a method of indicating capability of a terminal. The method is applied to a terminal, and includes a step 201.

Step 201: sending, to a network side, capability indication information indicating whether or not a terminal supports uplink dual-transmission per each band combination in a plurality of band combinations.

Specifically, the capability indication information includes at least one of following: first indication information of a band combination supported by the terminal; second indication information of a channel combination in the band combination in a case that the channel combination exists in the band combination; and third indication information indicating radio frequency characteristic of the terminal.

The first indication information includes type information of the band combination or information about whether or not the band combination must support uplink dual-transmission. It should be noted here that the type information of the band combination refers to an easy type or a difficult type, i.e., whether the band combination is an easy type or a difficult type.

The second indication information includes type information of the channel combination or information about whether or not the channel combination must support uplink dual-transmission. It should be noted here that the type information of the channel combination refers to an easy type or a difficult type, that is, whether the channel combination is an easy type or a difficult type.

The third indication information includes indication about whether or not the radio frequency characteristic of the terminal supports uplink dual-transmission.

It should also be noted that the uplink dual-transmission described in the present disclosure particularly refers to uplink parallel dual-transmission.

In some embodiments of the disclosure, the terminal transmits the capability indication information to the network side per each band combination of a plurality of band combination, thereby ensuring consistency of information in network interaction and ensuring communication reliability.

It should be noted first that, in a case that the band combination is of an easy type, the case indicates that the band combination must support uplink parallel dual-transmission, and in a case that the band combination is of a difficult type, the case indicates that the band combination does not necessarily support uplink parallel dual-transmission; in a case that the channel combination is of an easy type, the case indicates that the channel combination must support uplink parallel dual-transmission; and in a case that the channel combination is of a difficult type, the case indicates that the channel combination does not necessarily support uplink parallel dual-transmission.

Some embodiments of the present disclosure will be described in detail below in different implementations of step 201, respectively.

First, a specific implementation of step 201 is as follows: determining, according to deployment information of all frequency bands provided by the network side, the capability indication information indicating whether or not the terminal supports uplink dual-transmission; sending the capability indication information to the network side.

1. The terminal only reports the type of band combination.

It should be noted that, in this case, only the first indication information is included in the capability indication information, that is, the terminal may report the type of the band combination (BC) to the network side only, to inform the network side of whether the BC is a difficult type of BC or an easy type of BC.

In particular, when the terminal accesses a network, the terminal needs to report capability of the terminal, and according to whether or not the BC supported by the terminal is a difficult type of BC, the terminal reports, per each band combination (BC) of a plurality of band combinations, a 1-bit indication for indicating whether or not the BC is a difficult type of BC or whether or not the BC must support parallel uplink transmission, so as to exhibit a support status of the terminal for the uplink dual-transmission. This 1-bit indication will be reported to the network side along with other capabilities.

In such a condition, for CCs under the BC, it may be determined that whether or not the CCs are difficult CCs according to a manner (such as by calculating by means of a formula) in an agreement (e.g., a RAN4 agreement), i.e., in this case, the terminal implicitly indicates which CCs are difficult CCs.

2. The terminal reports the type of band combination and the type of channel combination simultaneously.

In this case, the capability indication information includes both the first indication information and the second indication information, and a specific implementation of the step 201 is: sending the capability indication information to the network side using a first preset bit combination; wherein different pieces of indication information in the capability indication information are indicated by different bits in the first preset bit combination, respectively; or different pieces of indication information in the capability indication information are indicated by joint encoding of bits in the first preset bit combination.

It should be noted that, in a case that the capability indication information includes the first indication information and the second indication information, and different pieces of indication information in the capability indication information are indicated by different bits in the first preset bit combination, respectively, a first number of bits in the first preset bit combination are used for indicating the first indication information, a second number of bits in the first preset bit combination are used for indicating the second indication information.

Generally, in order to reduce a bit overhead, the first preset bit combination may optionally use 2 bits, that is, 1 bit is used to indicate the first indication information, and the other 1 bit is used to indicate the second indication information.

For example, it is assumed that in a case that a first bit is 1, this represents that the BC is of a difficult type; in a case that the first bit is 0, this represents that the BC is of an easy type; and in a case that the second bit is 1, this represents that there is no easy CC under the BC; and in a case that the second bit is 0, this represents that there is an easy type of CC under this BC, then following cases exist:

11: the BC is of a difficult type, and all CCs under the BC are CCs of a difficult type, and the terminal supports uplink single transmission on all CCs.

10: the BC is of a difficult type, and a CC of an easy type exists under this BC, and the terminal must support uplink dual-transmission on the CC of the easy type under the BC, and a specific CC configuration is determined by the RAN4.

00: the BC is of an easy type, which means that all CCs under the BC are of an easy type, and the terminal must support uplink dual-transmission on all CCs under the BC.

01: reserved as an extension, for example, it can be used to indicate that a CC of an easy type exists under a BC of a difficult type, but dual-transmission must be supported on all CCs.

In a case that the first indication information and the second indication information are indicated by joint encoding of bits in the first preset bit combination, correspondence between bits and a difficult type of BC/a difficult type of CC or correspondence between bits and conditions of whether or not uplink dual-transmissions must be supported may be configured for different BCs by using a Bitmap. In a case that the terminal reports the capability, the terminal reports a string of bits according to a condition of whether or not the BC supported by the terminal is a difficult BC/CC or a condition of whether or not uplink dual-transmission must be supported. The network side knows a support status of the terminal for uplink dual-transmission (i.e., whether or not the uplink dual-transmission must be supported) according to the bitmap.

Second, a specific implementation of step 201 is as follows: determining, based on a frequency band dynamically configured by the network side for transmission, the capability indication information indicating whether or not the terminal supports uplink dual-transmission; sending the capability indication information to the network side.

Specifically, time of sending the capability indication information by the terminal may be following two cases: Case (1): when the terminal accesses a network or receives a request sent by a network device, sending the capability indication information to the network device; Case (2): after obtaining frequency band information configured by the network device, sending the capability indication information to the network device by the terminal.

1. The terminal only reports the type of band combination.

It should be noted that, in this case, the capability indication information includes only the first indication information, that is, the terminal may report only a BC type to the network side, to inform the network side of whether the BC is a difficult type of BC or an easy type of BC.

In particular, the terminal determines, based on a frequency band available for transmission configured by the network side and based on a manner (e.g., by calculating by means of a formula) agreed by RAN4, whether or not the band combinations are a difficult type of BCs, and reports 1 bit per BC indicating that the BC is a difficult type of BC or an easy type of BC, or indicating whether the BC must support parallel uplink transmission.

In such a condition, for CCs under the BC, it may be determined that whether or not the CCs are difficult type of CCs according to a manner (such as by calculating by means of a formula) in an agreement (e.g., a RAN4 agreement), i.e., in this case, the terminal implicitly indicates which CCs are difficult CCs 2. The terminal reports the type of band combination and the type of channel combination simultaneously.

In this case, the capability indication information includes both the first indication information and the second indication information, and a specific implementation of the step 201 is: sending the capability indication information to the network side using a second preset bit combination; wherein different pieces of indication information in the capability indication information are indicated by different bits in the second preset bit combination, respectively; or different pieces of indication information in the capability indication information are indicated by joint encoding of bits in the second preset bit combination.

It should be noted that, in a case that the capability indication information includes the first indication information and the second indication information, and different pieces of indication information in the capability indication information are indicated by different bits in the second preset bit combination, respectively, a third number of bits in the second preset bit combination are used for indicating the first indication information, a fourth number of bits in the second preset bit combination are used for indicating the second indication information.

Generally, in order to reduce a bit overhead, the second preset bit combination may optionally use 2 bits, that is, 1 bit is used to indicate the first indication information, and the other 1 bit is used to indicate the second indication information.

For example, it is assumed that in a case that a first bit is 1, this represents that the BC is a difficult type of BC; in a case that the first bit is 0, this represents that the BC is an easy type of BC; and in a case that the second bit is 1, this represents that there is no easy CC under the BC; and in a case that the second bit is 0, this represents that there is an easy type of CC under this BC, then following cases exist:

11: the BC is a difficult type of BC, and all CCs under the BC are CCs of a difficult type, and the terminal supports uplink single transmission on all CCs.

10: the BC is a difficult type of BC, and a CC of an easy type exists under this BC, and the terminal must support uplink dual-transmission on the CC of the easy type under the BC, and a specific CC configuration is determined by the RAN4.

00: the BC is an easy type of BC, which means that all CCs under the BC are of an easy type, and the terminal must support uplink dual-transmission on all CCs under the BC.

It should be noted that, in such a case, when the first indication information indicates that the band combination is of a difficult type and the second indication information indicates that an easy type of channel combination exists, it may also be indicated that which CCs are CCs of an easy type. Specifically, an implementation thereof is that the capability indication information further includes third indication information used to determine the easy type of channel combination.

For example, when which CCs are CCs of the easy type is determined by a calculation method for determining an easy type of CC supported by RAN4 (for example, RAN4 supports two calculation methods for determining the easy type of CC), the third indication information may indicate the type for which a calculation method is employed.

Generally, the third indication information, together with the first indication information and the second indication information, is indicated by a second preset bit combination.

For example, it is assumed that in a case that a first bit is 1, this represents that the BC is a difficult type of BC; in a case that the first bit is 0, this represents that the BC is an easy type of BC; and in a case that the second bit is 1, this represents that there is no easy CC under the BC; and in a case that the second bit is 0, this represents that there is an easy type of CC under this BC, then following cases exist:

11: the BC is a difficult type of BC, and all CCs under the BC are CCs of a difficult type, and the terminal supports uplink single transmission on all CCs.

00: the BC is an easy type of BC, which means that all CCs under the BC are of an easy type, and the terminal must support uplink dual-transmission on all CCs under the BC.

10/01: the BC is a difficult type of BC, and there is an easy type of CC under the BC, and how to determine the easy type of CC is determined by RAN4. If RAN4 supports the two calculation methods for determining an easy type of CC, the two different calculation methods can be distinguished by using two bit values.

In a case that the first indication information and the second indication information are indicated by joint encoding of bits in the second preset bit combination, correspondence between bits and a difficult type of BC/a difficult type of CC or correspondence between bits and a condition of whether or not uplink dual-transmissions must be supported may be configured for different BCs by using a Bitmap. In a case that the terminal reports the capability, the terminal reports a string of bits according to a condition of whether or not the BC supported by the terminal is a difficult type of BC/a difficult type of CC, or a condition of whether or not uplink dual-transmission must be supported. The network side knows a support status of the terminal for uplink dual-transmission (i.e., whether or not the uplink dual-transmission must be supported) according to the bitmap.

3. The terminal reports the type and the radio frequency characteristics of a band combination simultaneously.

In this case, the capability indication information includes both the first indication information and the third indication information, and a specific implementation of the step 201 is as follows: sending the capability indication information to the network side using a second preset bit combination; wherein different pieces of indication information in the capability indication information are indicated by different bits in the second preset bit combination, respectively; or different pieces of indication information in the capability indication information are indicated by joint encoding of bits in the second preset bit combination.

It should be noted that when the capability indication information includes the first indication information and the third indication information and different pieces of indication information in the capability indication information are indicated by different bits in the second preset bit combination, respectively, a fifth number of bits in the second preset bit combination are used for indicating the first indication information, and a sixth number of bits in the second preset bit combination are used for indicating the third indication information.

Generally, in order to reduce a bit overhead, the second preset bit combination may optionally use 2 bits, i.e., 1 bit is used to indicate the first indication information, and the other 1 bit is used to indicate the third indication information.

For example, it is assumed that in a case that a first bit is 1, this represents that the BC is a difficult type of BC; in a case that the first bit is 0, this represents that the BC is an easy type of BC; and in a case that the second bit is 1, this represents that radio frequency (RF) characteristic of the terminal does not support uplink dual-transmission; and in a case that the second bit is 0, this represents that the radio frequency characteristic of the terminal supports uplink dual-transmission, then following cases exist:

00: the BC is an easy type of BC, and all CCs are CCs of an easy type under the BC, and the RF characteristic of the terminal also supports the uplink dual-transmission, then all CCs under the BC for the terminal support uplink dual-transmission.

01: the BC is an easy type of BC, which means that all CCs under the BC are CCs of the easy type, and all CCs under the BC for the terminal must support uplink dual-transmission.

10: the BC is a difficult type of BC, and the RF characteristics of the terminal supports uplink dual-transmission, then a CC of an easy type under the difficult type of BC must support uplink dual-transmission, and a specific CC configuration is determined by RAN4.

11: The BC is a difficult type of CC, and the RF characteristic of the terminal does not support uplink dual-transmission. In such a condition, the terminal does not support uplink dual-transmission under the BC In a case that the first indication information and the third indication information are indicated by joint encoding of bits in a second preset bit combination, correspondence between bits and a difficult type of BC or correspondence between bits and a condition of whether or not RF characteristic must support uplink dual-transmission may be configured for different BCs by using a Bitmap. In a case that the terminal reports the capability, the terminal reports a string of bits according to a condition of whether or not the BC supported by the terminal is a difficult type of BC or a condition of whether or not uplink dual-transmission must be supported. The network side knows a support status of the terminal for uplink dual-transmission (i.e., whether or not the uplink dual-transmission must be supported) according to the bitmap.

It should be noted that the plurality of band combinations mentioned in some embodiments of the present disclosure refer to all or part of the band combinations supported by the terminal. For example, for different implementations of step 201, the plurality of band combinations described in the first implementation are all band combinations supported by the terminal, the plurality of band combinations described in the second implementation may be a part of the all band combinations supported by the terminal, and it will be understood by those skilled in the art that some embodiments of the present disclosure are not limited thereto.

In some embodiments of the disclosure, the terminal reports, to the network, type information of a band combination and type information of a channel combination in a band combination supported by the terminal, to ensure consistency of information in interaction with the network, thereby perfecting a 5G communication flow and ensuring communication reliability.

It should be noted that, in this embodiment, the terminal mainly interacts with the network device on the network side, the network device may be a Base Transceiver Station (BTS) in a Global System of Mobile communication (GSM) or a Code Division Multiple Access (CDMA) system, a NodeB (NB) in a Wideband Code Division Multiple Access (WCDMA) system, an Evolutional Node B (eNB or eNodeB), a relay station or an access point in a LTE system, or a base station in a further 5G network, or the like, which is not limited thereto.

Figure 3:
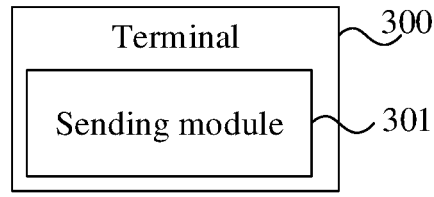
FIG. 3 is a schematic diagram of modules of a terminal according to some embodiments of the present disclosure.

As shown in FIG. 3, some embodiments of the present disclosure further provide a terminal 300. The terminal 300 includes a sending module 301. The sending module 301 is used to send, to a network side, capability indication information indicating whether or not a terminal supports uplink dual-transmission per each band combination in a plurality of band combinations, wherein the capability indication information includes at least one of following: first indication information of a band combination supported by the terminal; second indication information of a channel combination in the band combination in a case that the channel combination exists in the band combination; and third indication information indicating radio frequency characteristic of the terminal.

The first indication information includes type information of the band combination or information about whether or not the band combination must support uplink dual-transmission; the second indication information includes type information of the channel combination or information about whether or not the channel combination must support uplink dual-transmission; and the third indication information includes indication about whether or not the radio frequency characteristic of the terminal supports uplink dual-transmission.

Further, the sending module 301 includes a first determining unit and a first sending unit.

The first determining unit is used to determine, according to deployment information of all frequency bands provided by the network side, the capability indication information indicating whether or not the terminal supports uplink dual-transmission. The first sending unit is used to send the capability indication information to the network side.

Specifically, the first sending unit is used to: send the capability indication information to the network side using a first preset bit combination; wherein different pieces of indication information in the capability indication information are indicated by different bits in the first preset bit combination, respectively; or different pieces of indication information in the capability indication information are indicated by joint encoding of bits in the first preset bit combination.

Specifically, in a case that the capability indication information includes the first indication information and the second indication information, and different pieces of indication information in the capability indication information are indicated by different bits in the first preset bit combination, respectively, a first number of bits in the first preset bit combination are used for indicating the first indication information, a second number of bits in the first preset bit combination are used for indicating the second indication information.

Specifically, the first preset bit combination includes two bits.

Further, the sending module 301 includes a second determining unit and a second sending unit.

The second determining unit is used to determine, based on a frequency band dynamically configured by the network side for transmission, the capability indication information indicating whether or not the terminal supports uplink dual-transmission. The second sending unit is used to send the capability indication information to the network side.

Specifically, the second sending unit is used to: when the terminal accesses a network or receives a request sent by the network side, send the capability indication information to the network side; or, after obtaining frequency band information configured by the network side, send the capability indication information to the network side.

Specifically, the second sending unit is used to: send the capability indication information to the network side using a second preset bit combination; wherein different pieces of indication information in the capability indication information are indicated by different bits in the second preset bit combination, respectively; or different pieces of indication information in the capability indication information are indicated by joint encoding of bits in the second preset bit combination.

Specifically the capability indication information includes the first indication information and the second indication information; in a case that different pieces of indication information in the capability indication information are indicated by different bits in the second preset bit combination, respectively, a third number of bits in the second preset bit combination are used for indicating the first indication information, a fourth number of bits in the second preset bit combination are used for indicating the second indication information.

Specifically, the capability indication information includes the first indication information and the third indication information; in a case that different pieces of indication information in the capability indication information are indicated by different bits in the second preset bit combination, respectively, a fifth number of bits in the second preset bit combination are used for indicating the first indication information, and a sixth number of bits in the second preset bit combination are used for indicating the third indication information.

Specifically, the capability indication information includes the first indication information and the second indication information; in a case that the first indication information indicates that the type of the band combination is a difficult type and the second indication information indicates that an easy type of channel combination exists, the capability indication information further includes third indication information used to determine the easy type of channel combination.

Specifically, the second preset bit combination includes two bits.

Specifically, the type information includes an easy type or a difficult type.

The terminal provided by some embodiments of the present disclosure can implement each process implemented by the terminal in the method embodiment of FIG. 2, and is not repeated here to avoid repetition. The terminal according to some embodiments of the present disclosure sends, to the network side, the capability indication information indicating whether or not the terminal supports uplink dual-transmission per each band combination of a plurality of band combination, thereby perfecting a 5G communication flow and ensuring communication reliability.

Figure 4:
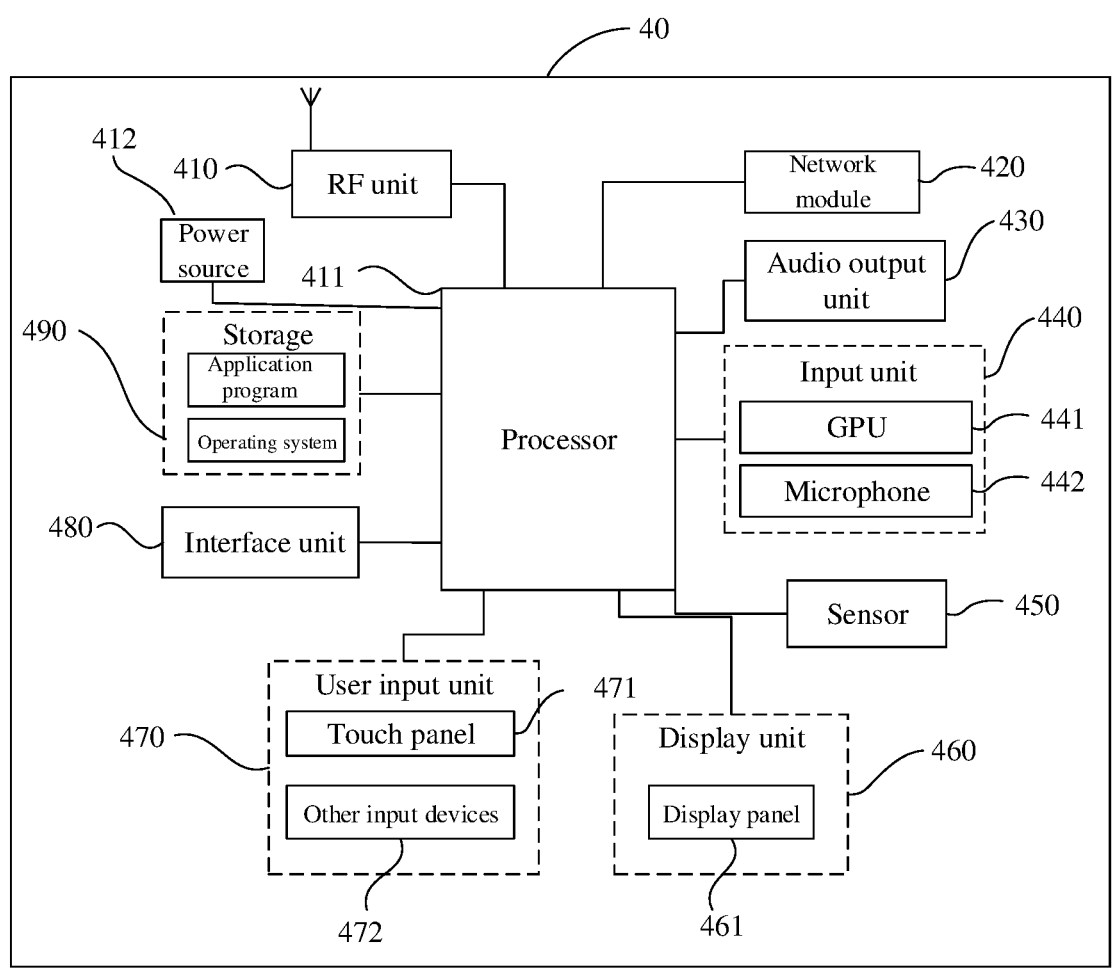
FIG. 4 is a block diagram showing a structure of a terminal according to some embodiments of the present disclosure.

FIG. 4 is a schematic diagram of a hardware structure of a terminal for implementing some embodiments of the present disclosure.

The terminal 40 includes, but is not limited to, a radio frequency (RF) unit 410, a network module 420, and an audio output unit 430, an input unit 440, a sensor 450, a display unit 460, a user input unit 470, an interface unit 480, a storage 490, a processor 411, and a power source 412 and other components. Those skilled in the art may understand that a structure of the terminal shown in FIG. 4 does not constitute a limitation on the terminal, and the terminal may include more or fewer components than those shown in the figure, or some combined components, or different arrangements of components. In some embodiments of the present disclosure, the terminal includes, but is not limited to, a mobile phone, a tablet computer, a notebook computer, a palmtop computer, a car-mounted terminal, a wearable device, a pedometer, and the like.

The radio frequency unit 410 is used to send, to a network side, capability indication information indicating whether or not a terminal supports uplink dual-transmission per each band combination in a plurality of band combinations, wherein the capability indication information includes at least one of following: first indication information of a band combination supported by the terminal; second indication information of a channel combination in the band combination in a case that the channel combination exists in the band combination; and third indication information indicating radio frequency characteristic of the terminal.

The first indication information includes type information of the band combination or information about whether or not the band combination must support uplink dual-transmission. The second indication information includes type information of the channel combination or information about whether or not the channel combination must support uplink dual-transmission. The third indication information includes indication about whether or not the radio frequency characteristic of the terminal supports uplink dual-transmission.

The terminal according to some embodiments of the present disclosure sends, to the network side, the capability indication information indicating whether or not the terminal supports uplink dual-transmission per each band combination of a plurality of band combination, thereby perfecting a 5G communication flow and ensuring communication reliability.

It should be noted that, in some embodiments of the present disclosure, the radio frequency unit 410 may be used for receiving and transmitting a signal in a process of sending and/or receiving information or in a process of calling. Specifically, after receiving downlink data from a base station, the radio frequency unit 410 transfers the downlink data to the processor 411; and sends uplink data to a base station. In general, the radio frequency unit 410 includes, but is not limited to, an antenna, at least one amplifier, a transceiver, a coupler, a low noise amplifier, a duplexer, and the like. In addition, the radio frequency unit 410 may also communicate with a network and other devices through a radio communication system.

The terminal provides a wireless broadband internet access for a user via the network module 420, such as assisting the user in sending and receiving emails, surfing web pages, accessing streaming media, and the like.

The audio output unit 430 may convert audio data received by the radio frequency unit 410 or the network module 420 or stored in the storage 490 into an audio signal and output as sound. The audio output unit 430 may also provide audio output (e.g., a call signal reception sound, a message reception sound, etc.) related to a specific function performed by the terminal 40. The audio output unit 430 includes a speaker, a buzzer, a receiver, and the like.

The input unit 440 is used to receive an audio or video signal. The input unit 440 may include a graphics processor (Graphics Processing Unit (GPU)) 441 and a microphone 442. The graphics processor 441 processes image data of still pictures or video obtained by an image capture device (such as a camera) in a video capture mode or an image capture mode. The processed image frame may be displayed on the display unit 460. Image frames processed by the graphics processor 441 may be stored in the storage 490 (or another storage medium) or sent via the radio frequency unit 410 or the network module 420. The microphone 442 may receive sound and be capable of processing such sound as audio data. The processed audio data may be converted, in a case of a telephone call mode, into a format output transmittable to a mobile communication base station via the radio frequency unit 410.

The terminal 40 also includes at least one sensor 450, such as a light sensor, a motion sensor, and other sensors. In particular, the light sensor includes: an ambient light sensor that can adjust the brightness of the display panel 461 according to the intensity of ambient light; and a proximity sensor that can turn off the display panel 461 and/or a backlight in a case that the terminal 40 moves close to an ear. As one type of motion sensor, an accelerometer sensor can detect a magnitude of acceleration in various directions (generally in three axis directions), detect a magnitude and a direction of gravity when the accelerometer sensor is stationary, and can be used to recognize a posture of a terminal (such as a horizontal/vertical screen switching, related games, magnetometer attitude calibration), vibration-recognition related functions (such as a pedometer, a knock); the sensor 450 may further include a fingerprint sensor, a pressure sensor, an iris sensor, a molecular sensor, a gyroscope, a barometer, a hygrometer, a thermometer, an infrared sensor, and the like, which will not be described here.

The display unit 460 is used to display information inputted by a user or information provided to the user. The display unit 46 may include a display panel 461. The display panel 461 is configured in a form of a Liquid Crystal Display (LCD) and an Organic Light-Emitting Diode (OLED) or the like.

The user input unit 470 may be operable to receive inputted numeric or character information and to generate key signal inputs related to user settings and function control of the terminal. Specifically, the user input unit 470 includes a touch panel 471 and other input devices 472. The touch panel 471, also referred to as a touch screen, may collect touch operations on or near the touch panel by the user (such as touch operations of the user using any suitable object or accessory, such as a finger, a stylus, and the like on or near the touch panel 4701). The touch panel 471 may include two parts, i.e., a touch detector and a touch controller, wherein the touch detector detects a touch orientation of the user, detects a signal caused by the touch operation, and transmits the signal to the touch controller; the touch controller receives touch information from the touch detector, converts the touch information into contact coordinates, sends the contact coordinates to the processor 411, receives a command from the processor 411, and executes the command from the processor 411. In addition, the touch panel 471 may also be implemented in various types such as a resistive type, a capacitive type, an infrared ray type, and a surface acoustic wave type. The user input unit 47 may also include other input devices 472 in addition to the touch panel 471. Specifically, other input devices 472 may include, but are not limited to, a physical keyboard, function buttons (such as volume control buttons, switch buttons, etc.), a trackball, a mouse, and an operating lever, which are not described herein.

Further, the touch panel 471 may be overlaid on the display panel 461. When the touch panel 471 detects a touch operation on or near the touch panel 471, the touch panel 471 transmits information of the touch operation to the processor 411 to determine a type of a touch event. The processor 411 then provides a corresponding visual output on the display panel 461 according to the type of the touch event. Although in FIG. 4, the touch panel 471 and the display panel 461 are two separate components used to implement input and output functions of the terminal, the touch panel 471 and the display panel 461 in some embodiments may be integrated to realize input and output functions of the terminal, and are not limited herein.

The interface unit 480 is an interface for connecting an external device to the terminal 40. For example, the external device may include a wired or wireless headset port, an external power source (or a battery charger) port, a wired or wireless data port, a memory card port, a port for connecting a device having an identification module, an audio input/output (I/O) port, a video I/O port, a headphone port, etc. The interface unit 480 may be used to receive input (e.g., data information, power and the like) from an external device and transmit the received input to one or more elements within the terminal or may be used to transmit data between the terminal 40 and an external device.

The storage 490 may be used to store software programs and various types of data. The storage 490 may mainly include a storage program region and a storage data region, wherein the storage program region may store an operating system, an application program required by at least one function, such as a sound playing function, an image playing function, and the like; the storage data region may store data (such as audio data, phonebook, etc.) created according to usage of a mobile phone. Further, the storage 490 may include a high-speed random access memory, and may also include a non-volatile storage, such as at least one magnetic disk storage device, a flash memory device, or other volatile solid-state storage devices.

The processor 411 is a control center of the terminal, connects various parts of the entirety of the terminal using various interfaces and lines, and the processor 411 performs various functions of the terminal and processes data, by running or executing a software program and/or a module stored in the storage 490 and invoking data stored in the storage 490, thereby integrally monitoring the terminal. The processor 411 may include one or more processing units; optionally, the processor 411 may be integrated with an application processor and a modem processor, wherein the application processor primarily handles operating systems, user interfaces, application programs, and the like, and the modem processor primarily handles wireless communication. It will be appreciated that the above modem processor may not be integrated into the processor 411.

The terminal 40 may also include a power source 412, such as a battery, for powering various components, optionally the power source 412 may be logically connected to the processor 411 through a power management system. Thereby, functions of charging management, discharging management, and power consumption management are realized by the power management system.

In addition, the terminal 40 includes some functional modules that are not shown and will not be described again here.

Optionally, some embodiments of the present disclosure also provide a terminal. The terminal includes a processor 411, a storage 490, and a computer program stored on the storage 490 and executable by the processor 411. When the computer program is executed by the processor 411, the processor 411 implements each process of the method embodiments of indicating capability of a terminal, and the same technical effect can be achieved. In order to avoid repetition, the detailed description thereof is omitted here.

Some embodiments of the present disclosure also provide a computer readable storage medium. The computer readable storage medium includes a computer program stored on the computer readable storage medium, wherein in a case that the computer program is executed by a processor, the computer program implements various steps of the method of indicating capability of a terminal described above, and the same technical effect may be achieved, which will not be repeated herein to avoid repetition. The computer readable storage medium may be, for example, a Read-Only Memory (ROM), a Random Access Memory (RAM), a magnetic disk or an optical disk, etc.

It should be noted that, in the present disclosure, such terms as "comprise", "have" and any variants thereof are intended to cover non-exclusive inclusions. Thus, a process, a method, a product, or a device including a series of elements includes not only the elements, but also other elements not explicitly listed or inherent to such processes, methods, products or devices. If no further limitation is provided, an element defined by such a clause "including/comprising one of . . . " does not preclude existence of another same or different element in a process, method, product or device including the element.

From the above description of embodiments, it will be clear to those skilled in the art that the method in some embodiments described above can be implemented by means of software plus a necessary general hardware platform, of course, may also be implemented by means of hardware, however, in many cases the former is a better implementation. Based on such understanding, an essential part of technical solutions of the present disclosure, or a part, contributing to prior art, of the technical solutions of the present disclosure may be embodied in form of a software product stored in a storage medium (such as ROM/RAM, a magnetic disk, an optical disc), the storage medium includes a number of instructions used to cause a terminal (which may be a mobile phone, a computer, a server, an air conditioner, or a network device, etc.) to perform the method described in various embodiments of the present disclosure.

The descriptions above are optional embodiments of the present disclosure. It should be noted that those skilled in the art may make various improvements and embellishments without departing principles of the present disclosure, and the various improvements and embellishments shall be within the protection scope of the present disclosure.

What is claimed is:

1. A method of indicating capability of a terminal, comprising:
sending, to a network side, capability indication information indicating whether or not a terminal supports uplink dual-transmission per each band combination in a plurality of band combinations;
wherein the capability indication information comprises at least one of following: first indication information of a band combination supported by the terminal; second indication information of a channel combination in the band combination in a case that the channel combination exists in the band combination; and third indication information indicating radio frequency characteristic of the terminal, the first indication information comprises type information of the band combination or information about whether or not the band combination must support uplink dual-transmission,
the second indication information comprises type information of the channel combination or information about whether or not the channel combination must support uplink dual-transmission,
the third indication information comprises indication about whether or not the radio frequency characteristic of the terminal supports uplink dual-transmission, and
the type information comprises an easy type or a difficult type.

2. The method of indicating capability of a terminal according to claim 1, wherein sending, to the network side, the capability indication information indicating whether or not the terminal supports uplink dual-transmission per each band combination, comprises:
determining, according to deployment information of all frequency bands provided by the network side, the capability indication information indicating whether or not the terminal supports uplink dual-transmission;
sending the capability indication information to the network side.

3. The method of indicating capability of a terminal according to claim 2, wherein sending the capability indication information to the network side, comprises sending the capability indication information to the network side using a first preset bit combination;
wherein different pieces of indication information in the capability indication information are indicated by different bits in the first preset bit combination, respectively; or different pieces of indication information in the capability indication information are indicated by joint encoding of bits in the first preset bit combination.

4. The method of indicating capability of a terminal according to claim 3, wherein, in a case that the capability indication information comprises the first indication information and the second indication information, and different pieces of indication information in the capability indication information are indicated by different bits in the first preset bit combination, respectively, a first number of bits in the first preset bit combination are used for indicating the first indication information, a second number of bits in the first preset bit combination are used for indicating the second indication information.

5. The method of indicating capability of a terminal according to claim 3, wherein the first preset bit combination comprises two bits.

6. The method of indicating capability of a terminal according to claim 1, wherein sending, to the network side, the capability indication information indicating whether or not the terminal supports uplink dual-transmission per each band combination, comprises:
determining, based on a frequency band dynamically configured by the network side for transmission, the capability indication information indicating whether or not the terminal supports uplink dual transmission;
sending the capability indication information to the network side.

7. The method of indicating capability of a terminal according to claim 6, wherein sending the capability indication information to the network side, comprises:
when the terminal accesses a network or receives a request sent by the network side, sending the capability indication information to the network side; or after obtaining frequency band information configured by the network side, sending the capability indication information to the network side.

8. The method of indicating capability of a terminal according to claim 6, wherein sending the capability indication information to the network side, comprises sending the capability indication information to the network side using a second preset bit combination;

wherein different pieces of indication information in the capability indication information are indicated by different bits in the second preset bit combination, respectively, or different pieces of indication information in the capability indication information are indicated by joint encoding of bits in the second preset bit combination.

9. The method of indicating capability of a terminal according to claim 8, wherein in a case that the capability indication information comprises the first indication information and the second indication information, and different pieces of indication information in the capability indication information are indicated by different bits in the second preset bit combination, respectively, a third number of bits in the second preset bit combination are used for indicating the first indication information, a fourth number of bits in the second preset bit combination are used for indicating the second indication information;

or, in a case that the capability indication information comprises the first indication information and the third indication information and different pieces of indication information in the capability indication information are indicated by different bits in the second preset bit combination, respectively, a fifth number of bits in the second preset bit combination are used for indicating the first indication information, and a sixth number of bits in the second preset bit combination are used for indicating the third indication information;

or, in a case that the capability indication information comprises the first indication information and the second indication information, the first indication information indicates that a type of the band combination is a difficult type and the second indication information indicates that an easy type of channel combination exists, the capability indication information further comprises third indication information used to determine the easy type of channel combination.

10. The method of indicating capability of a terminal according to claim 8, wherein the second preset hit combination comprises two bits.

11. A terminal, comprising:

a storage, a processor and a program stored on the storage and executable by the processor, wherein when the program is executed by the processor, the processor implements a method of indicating capability of a terminal comprising:

sending, to a network side, capability indication information indicating whether or not a terminal supports uplink dual-transmission per each band combination in a plurality of band combinations;

wherein the capability indication information comprises at least one of following: first indication information of a band combination supported by the terminal; second indication information of a channel combination in the band combination in a case that the channel combination exists in the band combination; and third indication information indicating radio frequency characteristic of the terminal, the first indication information comprises type information of the band combination or information about whether or not the band combination must support uplink dual-transmission, the second indication information comprises type information of the channel combination or information about whether or not the channel combination must support uplink dual-transmission, and the third indication information comprises indication about whether or not the radio frequency characteristic of the terminal supports uplink dual-transmission, and the type information comprises an easy type or a difficult type.

12. The terminal according to claim 11, wherein sending, to the network side, the capability indication information indicating whether or not the terminal supports uplink dual-transmission per each band combination, comprises:

determining, according to deployment information of all frequency bands provided by the network side, the capability indication information indicating Whether or not the terminal supports uplink dual-transmission;

sending the capability indication information to the network side.

13. The terminal according to claim 12, wherein sending the capability indication information to the network side, comprises sending the capability indication information to the network side using a first preset bit combination;

wherein different pieces of indication information in the capability indication information are indicated by different bits in the first preset bit combination, respectively; or different pieces of indication information in the capability indication information are indicated by joint encoding of bits in the first preset bit combination.

14. The terminal according to claim 13, wherein, in a case that the capability indication information comprises the first indication information and the second indication information, and different pieces of indication information in the capability indication information are indicated by different bits in the first preset bit combination, respectively, a first number of bits in the first preset bit combination are used for indicating the first indication information, a second number of bits in the first preset bit combination are used for indicating the second indication information.

15. The terminal according to claim 11, wherein sending, to the network side, the capability indication information indicating whether or not the terminal supports uplink dual-transmission per each band combination, comprises:

determining, based on a frequency band dynamically configured by the network side for transmission, the capability indication information indicating whether or not the terminal supports uplink dual-transmission;

sending the capability indication information to the network side.

16. The terminal according to claim 15, wherein sending the capability indication information to the network side, comprises:

when the terminal accesses a network or receives a request sent by the network side, sending the capability indication information to the network side; or after obtaining frequency band information configured by the network side, sending the capability indication information to the network side.

17. The terminal according to claim 15, wherein sending the capability indication information to the network side, comprises sending the capability indication information to the network side using a second preset bit combination;

wherein different pieces of indication information in the capability indication information are indicated by different bits in the second preset bit combination, respectively, or different pieces of indication information in the capability indication information are indicated by joint encoding of bits in the second preset bit combination.

18. The terminal according to claim 17, wherein in a case that the capability indication information comprises the first indication information and the second indication information, and different pieces of indication information in the capability indication information are indicated by different bits in the second preset bit combination, respectively, a third number of bits in the second preset bit combination are used for indicating the first indication information, a fourth number of bits in the second preset bit combination are used for indicating the second indication information;

or, in a case that the capability indication information comprises the first indication information and the third indication information and different pieces of indication information in the capability indication information ae indicated by different bits in the second preset bit combination, respectively, a fifth number of bits in the second preset bit combination are used for indicating the first indication information, and a sixth number of bits in the second preset bit combination are used for indicating the third indication information;

or, in a case that the capability indication information comprises the first indication information and the second indication information, the first indication information indicates that a type of the band combination is a difficult type and the second indication information indicates that an easy type of channel combination exists, the capability indication information further comprises third indication information used to determine the easy type of channel combination.

19. A non-transitory computer-readable storage medium, wherein a program is stored on the non-transitory computer-readable storage medium, when the program is executed by a processor, the processor implements a method of indicating capability of a terminal, the method comprises:

sending, to a network side, capability indication information indicating whether or not a terminal supports uplink dual-transmission per each band combination in a plurality of band combination;

wherein the capability indication information comprises at least one of the following; first indication information of a band combination supported by the terminal; second indication information of a channel combination in the band combination in a case that the channel combination exists in the band combination; and third indication information indicating radio frequency characteristics of the terminal, the first indication information comprises type information of the band combination or information about whether or not the band combination must support uplink dual-transmission, the second indication information comprises type information of the channel combination or information about whether or not the channel combination must support uplink dual-transmission, the third indication information comprises indication about whether or not the radio frequency characteristic of the terminal supports uplink dual-transmission, and the type information comprises an easy type or a difficult type.

* * * * *